Nov. 19, 1929.  H. F. SCHROEDER  1,735,880
GUIDE THERMOMETER
Filed July 25, 1927
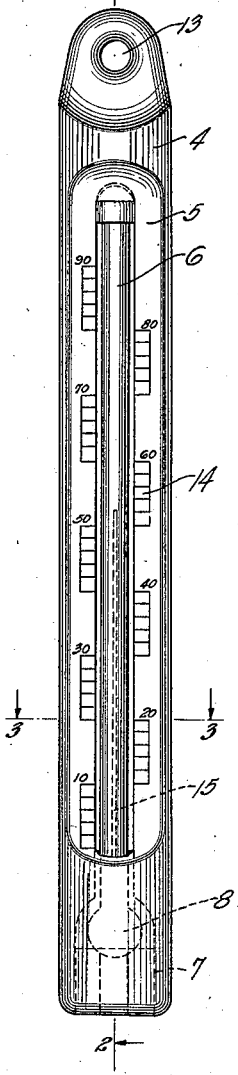
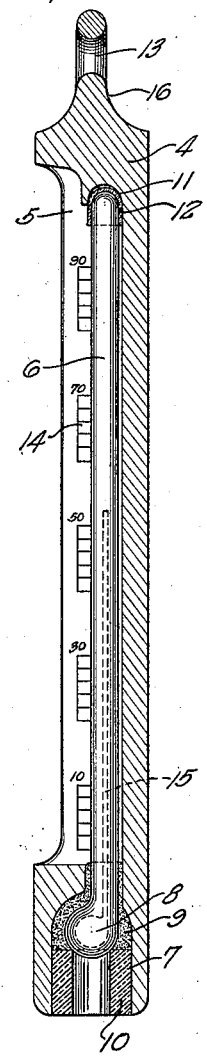
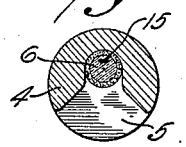
INVENTOR.
Henry F. Schroeder,
BY Morsell, Keeney & Morsell
ATTORNEYS Patented Nov. 19, 1929

1,735,880

UNITED STATES PATENT OFFICE

HENRY F. SCHROEDER, OF MILWAUKEE, WISCONSIN, ASSIGNOR TO MILWAUKEE DIE CASTING CO., OF MILWAUKEE, WISCONSIN, A CORPORATION OF WISCONSIN

GUIDE THERMOMETER

Application filed July 25, 1927. Serial No. 208,290.

This invention relates to improvements in guide thermometers.

A study of the habits of fish has revealed the fact that on torrid summer days, they congregate near the bottom of the lake or river in the sections in which the water is the coldest to thereby escape the intense heat. As a result of this, fishermen desire to anchor their boats over these sections of cold water.

It is one of the objects of the present invention to provide an instrument for determining the temperature of the water near the bottom of a lake or river.

It is a further object of this invention to provide a specially constructed thermometer for accomplishing the aforementioned purpose.

A further object of this invention is to provide a guide thermometer having a weight greater than the specific gravity of water so that it may be readily lowered to a point of considerable depth.

A further object is to provide a guide thermometer which will allow for expansion of the thermometer tube resulting from the changes of temperature to which the thermometer is necessarily subjected.

A further object is to provide a guide thermometer in which the string or other lowering means will be protected at the point of attachment.

It is a further object of this invention to provide a thermometer which is so constructed as to guard against breakage when the instrument comes in contact with objects on the bottom of the lake.

It is a still further object of this invention to provide a guide thermometer which is simple in construction, is durable, and is well adapted for the purpose described.

With the above and other objects in view, the invention consists of the improved guide thermometer and all its parts and combinations, or the equivalents thereof, as hereinafter more fully pointed out.

In the drawing in which the same reference numerals designate the same parts in all of the views:

Fig. 1 is an enlarged front elevation of the improved guide thermometer;

Fig. 2 is a vertical sectional view thereof, taken on the line 2—2 of Fig. 1; and Fig. 3 is a cross section taken on the line 3—3 of Fig. 1.

Referring to the drawing, the numeral 4 designates the outer casing, which is preferably constructed of aluminum or of some material having a specific gravity greater than water, and which has a front recess extending the greater part of its length in which the thermometer tube 6 is positioned. The casing also has a lower end bore 7 enlarged near the lower end of the casing to accommodate the thermometer bulb 8. The bulb is held in place by a yielding cement or other sealing material as at 9, and a cored rubber plug 10 fills the space between the cement and the lower end of the thermometer casing. The upper end of the tube is received in an upper recess 11 and is there anchored in place by a rubber sleeve 12. The recess is sufficiently large to allow for vertical and horizontal expansion of the tube. This expansion is bound to occur because of the sudden changes in temperature to which the instrument is subjected. The yielding cement will also allow for expansion of the tube. The upper part of the casing is tapered upwardly in the front and back to form an eye 13 for attaching a string or wire by which the thermometer is lowered into the water. When a string or other lowering means is attached to the eye 13 it is protected by the tapered portion 16 immediately below said eye from being cut or broken. This danger of the string being cut would be especially prevalent if the instrument were allowed to lie flat on the bottom of the lake. With the tapering construction, however, even when the instrument is in a horizontal position, the string at the point of attachment will be kept off the bottom of the lake. A graduated scale 14 is marked out or otherwise fixed to the recess 5 adjacent to the thermometer tube. Mercury 15 is within the thermometer bulb and tube.

In use, the thermometer is merely lowered into the water by means of a string or wire until the lower end of it rests upon the bottom of the lake. The water, of course, enters the opening in the cored rubber plug 10 and comes in contact with the thermometer bulb. The instrument is allowed to remain in the water a sufficient length of time for the mercury to properly record the temperatue, and then the instrument is withdrawn from the water and the recorded temperature read. If the water is not deemed cold enough to attract the fish, then another spot is tested until a place where there is water of the desired temperature is found.

It will be seen that the thermometer is so constructed that water may come in contact with the bulb, and still the bulb is so protected that there is no danger of its being broken by reason of coming in contact with some object on the bottom of the lake. The tube is also protected by being mounted within a recess in the casing.

What I claim is:

1. A guide thermometer comprising a casing having a lower end bore, a thermometer tube formed with a bulb at one end mounted in said casing, the lower end bore accommodating the bulb, and a cored plug in the bore between the bulb and the lower end of the casing.

2. A guide thermometer comprising a casing having a lower end bore, a thermometer tube formed with a bulb at one end and mounted in said casing, the lower end bore accommodating the bulb, sealing means between the bulb and the sides of the bore, and a cored plug in the bore between said sealing means and the lower end of the casing.

3. A guide thermometer comprising a casing having a front recess, said casing also having a lower end bore and an upper recess, a thermometer tube formed with a bulb at its lower end and mounted in said front recess, the tube having its upper end in the upper recess and its lower end in the lower end bore, the lower portion of the bore being enlarged to accommodate the bulb, a rubber sleeve in the upper recess, a sealing cement between the sides of the bore and the bulb, and a cored rubber plug in the bore between the sealing cement and the lower end of the casing.

In testimony whereof, I affix my signature.

HENRY F. SCHROEDER.